(12) United States Patent
Berger et al.

(10) Patent No.: US 9,347,565 B2
(45) Date of Patent: May 24, 2016

(54) ROTATING MECHANICAL SEAL ARRANGEMENT WITH IMPROVED GAS SEPARATION

(71) Applicant: EagleBurgmann Germany GmbH & Co. KG, Wolfratshausen (DE)

(72) Inventors: Wolfgang Berger, Benediktbeuern (DE); Michael Riedl, Bergheim (DE); Ernst Pochmann, Kochel Am See (DE); Josef Gerg, Gaissach (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 14/519,204

(22) Filed: Oct. 21, 2014

(65) Prior Publication Data

US 2015/0323078 A1    Nov. 12, 2015

(30) Foreign Application Priority Data

May 9, 2014    (DE) .......................... 10 2014 208 738

(51) Int. Cl.
*F16J 15/34*    (2006.01)

(52) U.S. Cl.
CPC .......... *F16J 15/3404* (2013.01); *F16J 15/3484* (2013.01); *F16J 15/3496* (2013.01)

(58) Field of Classification Search
CPC ......... F16J 15/34; F16J 15/3492; F16J 15/40; F16J 15/403; F16J 15/406; F16J 15/348; F16J 15/3484
See application file for complete search history.

(56) References Cited

U.S. PATENT DOCUMENTS

| 3,746,350 A | 7/1973 | Mayer et al. |
| 6,695,315 B1 * | 2/2004 | Anderberg ........... F16J 15/3452 277/369 |
| 2010/0013167 A1 * | 1/2010 | Bachhofner ........... F16J 15/004 277/558 |

FOREIGN PATENT DOCUMENTS

| CH | 489732 A | 4/1970 |
| DE | 2714284 A1 | 10/1978 |
| JP | H0882373 A | 3/1996 |

*Primary Examiner* — Gilbert Lee
(74) *Attorney, Agent, or Firm* — Locke Lord LLP; Scott D. Wofsy; Joshua L. Jones

(57) ABSTRACT

The invention relates to a rotating mechanical seal arrangement (1) for sealing a product side (5) at a rotating component, comprising a first rotating mechanical seal (2) with a first rotating slide ring (21) and a first stationary slide ring (22) which define a first sealing gap (23) between them, a second rotating mechanical seal (3) with a second rotating slide ring (31) and a second stationary slide ring (32) which define a second sealing gap (33) between them, a fluid space (4) which is limited by the first and second rotating mechanical seals (2, 3), wherein the first rotating mechanical seal (2) is lubricated with a product medium of the product side (5), and wherein the second rotating mechanical seal (3) is lubricated with a liquid quench medium of a quench supply unit (7), the quench medium being located in the fluid space (4), a quench outlet (8) via which quench medium may be discharged from the fluid space (4), a gas outlet (9) via which a gas located in the fluid space may be discharged, and a throttle device (10) which is arranged in the fluid space (4) between the first rotating mechanical seal (2) and the second rotating mechanical seal (3) and divides the fluid space (4) into a product-side fluid space region (4a) and an atmosphere-side fluid space (4b), wherein the gas outlet (9) is arranged at the product-side fluid space region (4a) and the quench outlet (8) is arranged at the atmosphere-side fluid space region (4b).

11 Claims, 1 Drawing Sheet

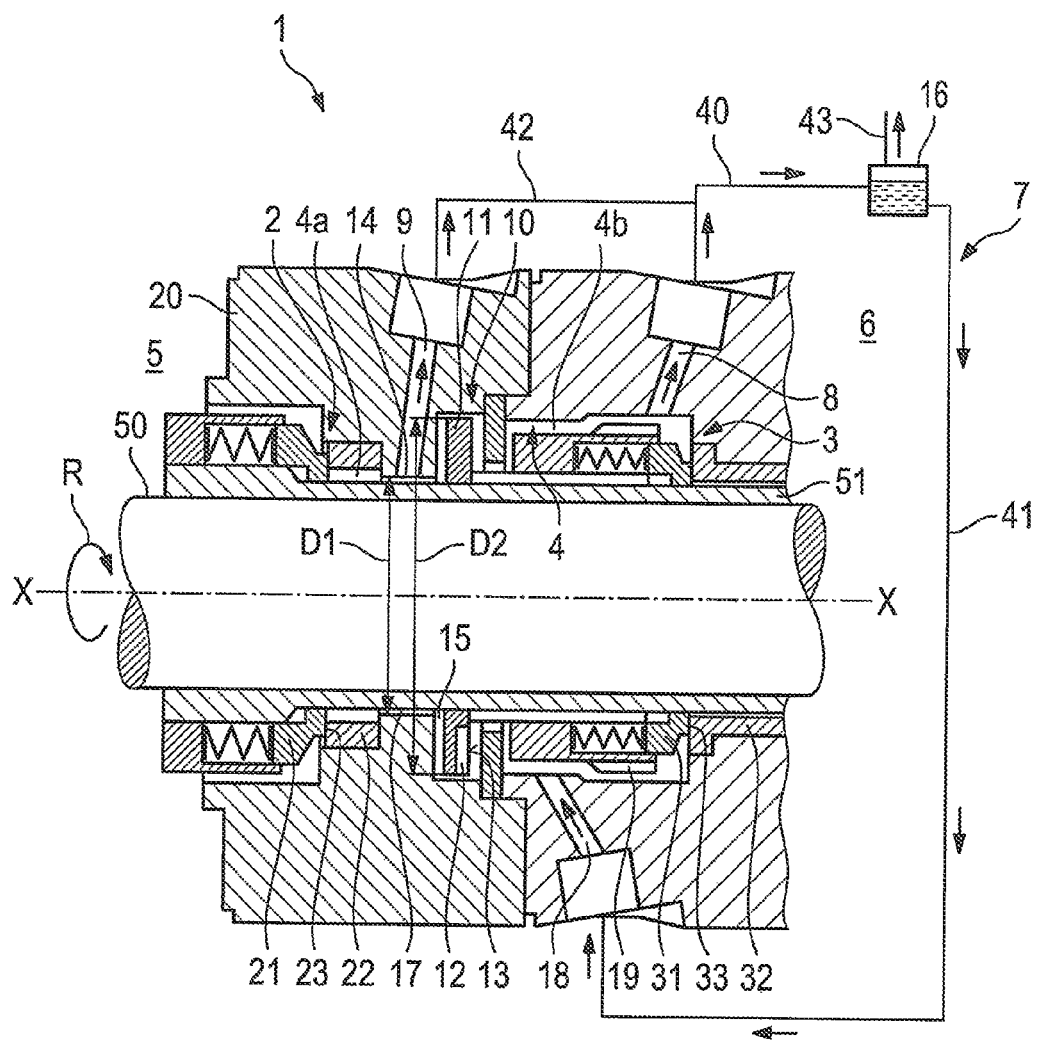

ROTATING MECHANICAL SEAL ARRANGEMENT WITH IMPROVED GAS SEPARATION

The present invention relates to a rotating mechanical seal arrangement with improved gas separation to prevent a rotating mechanical seal from running dry.

Different embodiments of rotating mechanical seal arrangements are known from prior art. In a so-called tandem design, where two rotating mechanical seals are connected one after another in series, the atmosphere-side rotating mechanical seal is usually lubricated by a quench medium disposed in a fluid space between the two rotating mechanical seals. The product-side rotating mechanical seal is usually lubricated by the product itself. A pressure on the product side is higher than in the fluid space between the two rotating mechanical seals, so that a leakage starting from the product through the product-side sealing gap into the fluid space occurs. If the product to be sealed is a gas, gas may thus enter the fluid space. If the product to be sealed is a liquid, this liquid may evaporate via the product-side sealing gap due to the pressure drop and also lead to gas enrichment in the fluid space. Said leakage is even intensified if grooves or the like are provided at the sliding surfaces of the product-side rotating mechanical seal, or if the latter comprises a diamond coating where the rotating mechanical seal must be operated with a slightly larger sealing gap. The enrichment of gas in the quench medium in the fluid space may lead to the formation of closed gaseous rings as of a certain volume concentration of the gas. This may result in a poor lubrication of the atmosphere-side rotating mechanical seal, where in particular the risk of overheating and running dry may occur. The high gas concentration may furthermore also affect the function of a pump device within the fluid space, e.g. a pump ring or the like, so that no more circulation of the quench medium in the fluid space takes place. Thereby, in particular the temperature of the quench medium will rise which may also lead to a sealing failure, in particular of the atmosphere-side rotating mechanical seal.

It is therefore the object of the present invention to provide a rotating mechanical seal arrangement with two rotating mechanical seals which permits a secure discharge of gas from a fluid space between the two rotating mechanical seals while it is of a simple construction and can be easily and inexpensively manufactured.

This object is achieved by a rotating mechanical seal arrangement having the features of claim 1. The subclaims show preferred further developments of the invention.

The rotating mechanical seal arrangement according to the invention having the features of claim 1 is advantageous in that a gas located in a fluid space between a first and a second rotating mechanical seal may be securely discharged, so that in particular the formation of gaseous rings in the fluid space may be prevented. By this, the rotating mechanical seal arrangement may be sufficiently cooled at all operating points, and furthermore sufficient sealing may be ensured. Furthermore, the service life of the rotating mechanical seal arrangement may be significantly extended. This is achieved according to the invention in that, besides a quench outlet via which a quench medium may be discharged from the fluid space, a gas outlet is additionally provided via which gas located in the fluid space may be discharged. Furthermore, a throttle device is provided which is disposed in the fluid space between the two rotating mechanical seals. The throttle device divides the fluid space into a product-side fluid space region and an atmosphere-side fluid space region. The gas outlet is arranged at the product-side fluid space region. The quench outlet is arranged in the atmosphere-side fluid space region. By this arrangement, gas entering the fluid space via the first rotating mechanical seal may be discharged directly above the additional gas outlet without any risk of said gas reaching the second rotating mechanical seal. Thus, the second rotating mechanical seal may always be sufficiently supplied with quench medium, and the required lubrication conditions of the second rotating mechanical seals may always be met.

The throttle device preferably comprises a rotating ring disk that rotates with the rotating component, in particular a shaft or the like. The throttle device provided with the rotating ring disk constitutes an additional barrier for the gas, so that a secure discharge of the penetrated gas via the gas outlet is permitted.

The ring disk moreover preferably comprises transport means. The transport means at the ring disk are adapted to transport the quench medium towards the first rotating mechanical seal, so that a counterflow through the gas is clearly aggravated. The transport means are, for example, blades or wings. The transport means are moreover preferably arranged at a side of the ring disk facing the second rotating mechanical seal to permit increased transportation of quench medium towards the first rotating mechanical seal into the product-side fluid space region.

An orifice of the gas outlet is moreover preferably arranged at the fluid space on a first diameter which is smaller than a maximum outer diameter of the ring disk of the throttle device. Thereby, an even safer discharge of the gas is achieved since the gas tends to be present at inner circumferential regions of the fluid space due to centrifugal forces, and the liquid quench medium is located at outer circumferential regions of the fluid space due to centrifugal forces.

To achieve an optimal sealing and throttle effect of the throttle device, the throttle device preferably comprises a labyrinth with several fluid diversion regions.

A minimum cross-section of the fluid space is moreover preferably provided at the gas outlet. This can ensure that the gas is discharged directly into the gas outlet. The minimum cross-section is furthermore preferably provided at the smallest inner diameter of the fluid space.

According to a further preferred embodiment of the present invention, the quench supply unit comprises a degassing container. Here, the gas outlet is preferably connected to the degassing container. Thus, gas discharged from the fluid space may be separated at the degassing container to be emitted, for example, via a valve, a degassing container, or the like, to the atmosphere or to a torch.

To achieve a preferably flow-enhancing transition of the gas from the fluid space into the gas outlet, the gas outlet is inclined in the rotating direction of the rotating component with respect to a radial direction of the rotating mechanical seal arrangement. Here, at the inner circumference of the housing component in which the gas outlet is provided, a groove leading to the gas outlet and extending in the circumferential direction, which groove is slowly getting deeper, may be additionally provided to achieve an even better flow of the gas in the gas outlet.

The quench supply unit is moreover preferably embodied as a circuit and comprises an inlet to the fluid space which ends in the atmosphere-side fluid space region.

According to a further preferred embodiment of the present invention, a pump means is furthermore provided and adapted to transport the quench medium in the fluid space, the pump means being disposed between the throttle device and the second rotating mechanical seal at the atmosphere-side fluid space region. According to the invention, a pump means is defined as any transport means which permits a transport of the quench medium in the fluid space by rotation, for example in the form of pumping screws or pump rings or the like.

At least one of the slide rings, in particular one of the slide rings of the product-side rotating mechanical seal, moreover preferably comprises a diamond coating. Since a sealing gap in rotating mechanical seals with diamond coatings tends to be slightly larger compared to other rotating mechanical seals, increased leakage from the product side into the fluid space occurs in case of diamond-coated slide rings, so that the present invention is here particularly suited for discharging gas additionally present in the fluid space.

One embodiment will be described below in detail with reference to the accompanying drawing. In the drawing:

FIG. 1 is a schematic, partially sectional view of a rotating mechanical seal arrangement according to a preferred embodiment of the invention.

As is apparent from FIG. 1, the rotating mechanical seal arrangement 1 comprises a first rotating mechanical seal 2 and a second rotating mechanical seal 3. In the axial direction X-X, a fluid space 4 is embodied between the two rotating mechanical seals 2, 3.

The rotating mechanical seal arrangement 1 thus comprises a first rotating mechanical seal 2 with a first rotating slide ring 21 and a first stationary slide ring 22 which define a first sealing gap 23 between them. Furthermore, the rotating mechanical seal arrangement 1 comprises a second rotating mechanical seal 3 with a second rotating slide ring 31, a second stationary slide ring 32, and a sealing gap 33 formed between the two slide rings.

The rotating mechanical seal arrangement 1 is thus provided in a so-called tandem design with two rotating mechanical seals 2, 3 being connected in series to seal a product side 5 from an atmosphere side 6.

In the fluid space 4, a liquid quench medium is located which is provided by a quench supply unit 7.

The quench supply unit 7 comprises a quench outlet 8 which is connected with a degassing container 16 via a discharge line 40. A gas outlet 43 is provided at the degassing container 16 to separate discharged gas from the degassing container. The degassing container 16 is furthermore connected with the fluid space 4 via a supply line 41 and an inlet 18 for the quench medium.

A pump ring 19 is provided in the fluid space 4 for conveying the quench medium. As an alternative or in addition, a pump may also be arranged in a line section of the quench supply unit.

As is apparent from FIG. 1, the rotating slide rings may be pretensioned by pretensioning elements in the axial direction X-X.

According to the invention, an additional gas outlet 9 and a throttle device 10 are now provided. The throttle device divides the fluid space into a product-side fluid space region and an atmosphere-side fluid space region. As is apparent from FIG. 1, the gas outlet 9 is arranged, in the axial direction X-X, at the product-side fluid space region 4a between the throttle device 10 and the first rotating mechanical seal 2. The quench outlet 8 is arranged at the atmosphere-side fluid space region 4b between the throttle device 10 and the second rotating mechanical seal 3.

The gas outlet 9 is provided in a housing 20 or the like.

Thus, gas which enters in operation via the first sealing gap 23 of the first rotating mechanical seal 2, which is lubricated with the product from the product side 5, may be discharged through the gas outlet 9 disposed relatively closely to the first rotating mechanical seal 2. Here, the throttle device 10 prevents gas having entered the fluid space 4 via the first sealing gap 23 from being guided further towards the second rotating mechanical seal 3.

The gas outlet 9 is connected to the discharge line 40 of the quench outlet 8 via a connecting line 42. Thereby, the gas discharged via the gas outlet 9 may be guided into the discharge line 40 and from there into the degassing container 16. It should be noted that it is also possible for the gas outlet 9 to lead directly into atmosphere, or to provide an additional second degassing container into which the connecting line 42 of the gas outlet 9 leads to separate the gas.

As is apparent from FIG. 1, the throttle device 10 is embodied in the form of a labyrinth 15 with several fluid deviations. The throttle device 10 furthermore comprises a ring disk 11 which rotates together with the rotating component which is, in this embodiment, a shaft 50 with a shaft sleeve 51.

The ring disk 11 furthermore comprises a plurality of transport means 12 which are arranged at a side 13 of the ring disk facing the second rotating mechanical seal 3. The transport means 12 may be, for example, blades or wings or the like. The transport means 12 transport liquid quench medium from the atmosphere-side fluid space 4b of the fluid space 4 towards the product-side fluid space 4a in the fluid space 4. Thus, the transport means of the rotating ring disk 11 provide an additional counterflow against the gas which may then be securely removed from the fluid space 4 via the gas outlet 9.

As is furthermore apparent from FIG. 1, an orifice 14 of the gas outlet 9 is provided at a first diameter D1 which is smaller than a second diameter D2. The second diameter D2 is a maximum outer diameter of the ring disk 11.

Furthermore, the orifice 14 of the gas outlet 9 is arranged at a minimum cross-section 17 of the fluid space. As is apparent from FIG. 1, the minimum cross-section 17 is provided directly within the gas outlet 9, so that gas, which tends to gather at the inner circumferential region of the fluid space due to rotation and centrifugal forces, and the intensified flow are entrained at the minimum cross-section 17 and may be securely discharged into the gas outlet 9.

To achieve a particularly easy introduction of the gas into the gas outlet 9, the gas outlet 9 is preferably arranged in the rotational direction R preferably inclined with respect to the radial direction of the rotating mechanical seal arrangement, which is not shown in the section of FIG. 1. Starting from the orifice 14, the gas outlet 9 then does not extend in the radial direction of the shaft 50 but at an angle to it inclined in the rotational direction whereby the flow of the gas into the gas outlet is clearly improved. Furthermore, a groove extending in the circumferential direction at the inner circumference of the housing 20 may be provided in the housing 20, which groove preferably deepens continuously towards the orifice 14 to provide additional guidance for the gas towards the gas outlet 9.

In FIG. 1, the arrows each indicate the directions of flow of the quench medium through the quench supply unit 7 and the gas discharged via the gas outlet 9.

It should be noted that the product at the product side 5 may be a liquid or a gaseous product. In case of gaseous products, the first rotating mechanical seal 2 is embodied as gas-lubricated rotating mechanical seal, lubricated by the gaseous product. Thereby, additional gas may reach the fluid space 4 which may be securely discharged into the gas outlet 9 by the measures according to the invention. If the medium on the product side is a liquid, the latter may evaporate due to the pressure differential between the product side and the fluid space 4 in the first sealing gap 23 whereby undesired gas in the fluid space 4 may be formed which may also be discharged via the gas outlet 9 by the measures according to the invention.

In particular, the present invention permits the use of diamond-coated slide rings at the product-side first rotating mechanical seal 2. Thereby, the rotating mechanical seal 2 may have a long service life due to the diamond-coated slide rings, and the second rotating mechanical seal 3 may be embodied with any desired sliding surfaces and also have a significantly longer service life than in prior art since no damages caused by the gas can occur at the second rotating mechanical seal 3.

LIST OF REFERENCE NUMERALS 1 rotating mechanical seal arrangement
2 first rotating mechanical seal
3 second rotating mechanical seal
4 fluid space
4a product-side fluid space region
4b atmosphere-side fluid space region
5 product side
6 atmosphere side
7 quench supply unit
8 quench outlet
9 gas outlet
10 throttle device
11 ring disk
12 transport means
13 atmosphere side of the ring disk
14 orifice of the gas outlet
15 labyrinth
16 degassing container
17 minimum cross-section of the fluid space
18 inlet of the quench medium
19 pump ring
20 housing
21 first rotating slide ring
22 first stationary slide ring
23 first sealing gap
31 second rotating slide ring
32 second stationary slide ring
33 second sealing gap
40 discharge line
41 supply line
42 connecting line
43 outlet
50 shaft
51 shaft sleeve

The invention claimed is:

1. Rotating mechanical seal arrangement for sealing a product side at a rotating component, comprising:
a first rotating mechanical seal with a first rotating slide ring and a first stationary slide ring which define a first sealing gap between them;
a second rotating mechanical seal with a second rotating slide ring and a second stationary slide ring which define a second sealing gap between them;
a fluid space which is limited by the first and second rotating mechanical seals;
wherein the first rotating mechanical seal is lubricated with a product medium of the product side, and wherein the second rotating mechanical seal is lubricated with a liquid quench medium of a quench supply unit, the quench medium being located in the fluid space;
a quench outlet via which quench medium may be discharged from the fluid space;
a gas outlet via which a gas located in the fluid space may be discharged; and
a throttle device which is arranged in the fluid space between the first rotating mechanical seal and the second rotating mechanical seal and divides the fluid space into a product-side fluid space region and an atmosphere-side fluid space;
wherein the gas outlet is arranged at the product-side fluid space region and the quench outlet is arranged at the atmosphere-side fluid space region, wherein the throttle device includes a rotating ring disk, wherein an orifice of the gas outlet to the fluid space is arranged on a first diameter (D1) which is smaller than a maximum outer diameter (D2) of the ring disk.

2. Rotating mechanical seal arrangement according to claim 1, wherein transport means are arranged at the ring disk.

3. Rotating mechanical seal arrangement according to claim 2, wherein the transport means are arranged at a side of the ring disk facing the second rotating mechanical seal.

4. Rotating mechanical seal arrangement according to claim 1, wherein the throttle device includes a labyrinth with several fluid deviation regions.

5. Rotating mechanical seal arrangement according to claim 1, wherein a minimum cross-section of the fluid space is arranged at the gas outlet.

6. Rotating mechanical seal arrangement according to claim 1, wherein the quench supply unit includes a degassing container.

7. Rotating mechanical seal arrangement according to claim 6, wherein the gas outlet is connected with the degassing container.

8. Rotating mechanical seal arrangement according to claim 1, wherein the gas outlet is inclined in the rotational direction (R) with respect to a radial direction of the rotating mechanical seal arrangement.

9. Rotating mechanical seal arrangement according to claim 1, wherein an inlet of the quench medium to the fluid space is arranged at the atmosphere-side fluid space region.

10. Rotating mechanical seal arrangement according to claim 1, which includes a pump means which is arranged in the atmosphere-side fluid space region for transporting quench medium.

11. Rotating mechanical seal arrangement according to claim 1, wherein the first rotating mechanical seal and/or the second rotating mechanical seal includes at least one slide ring with diamond coating.

* * * * *